R. H. PRESTIEN.
AUTOMOBILE ATTACHMENT.
APPLICATION FILED JUNE 8, 1912.
1,079,951.
Patented Dec. 2, 1913.
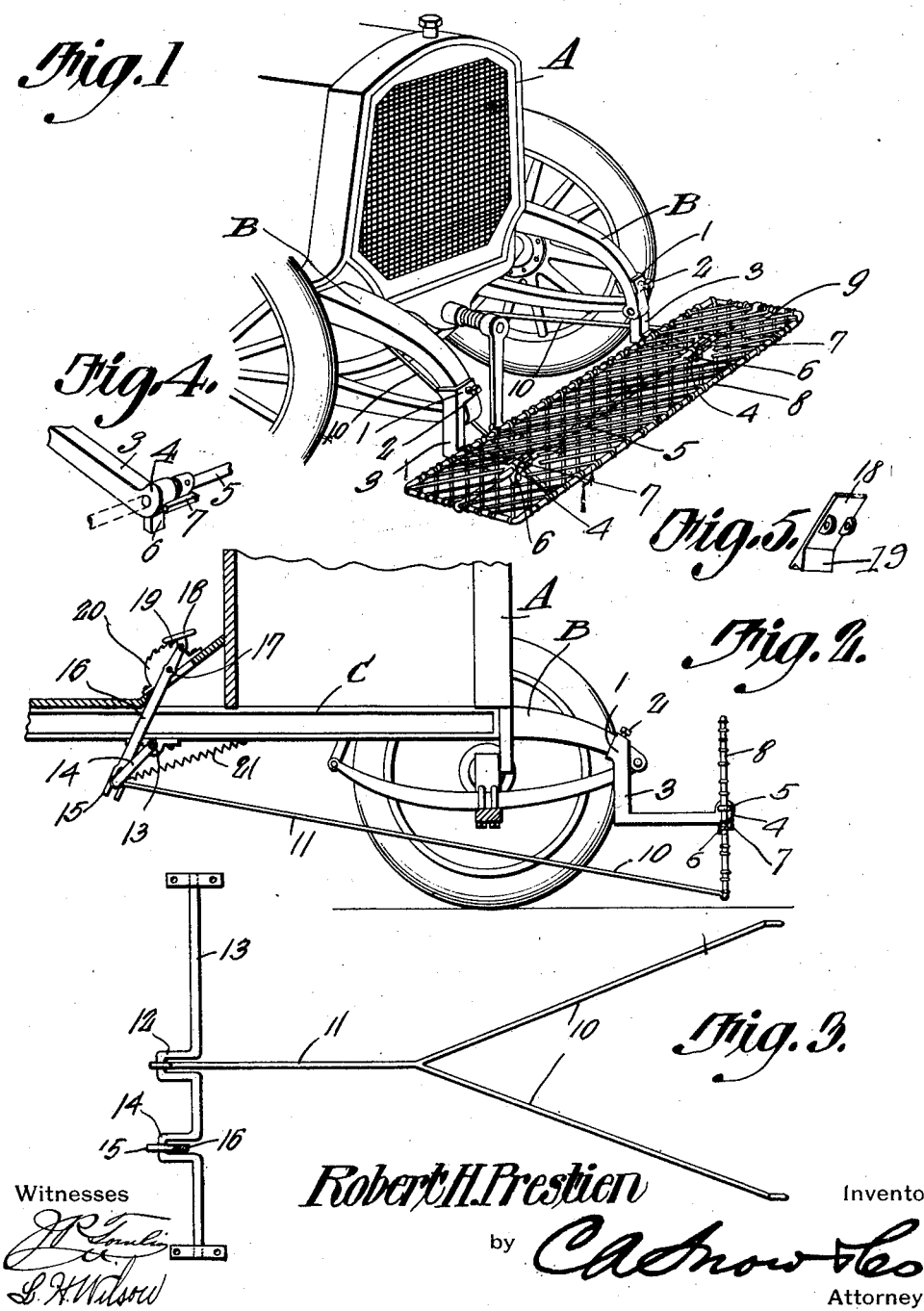
Witnesses
Robert H. Prestien, Inventor
by C. A. Snow & Co., Attorneys

UNITED STATES PATENT OFFICE.

ROBERT H. PRESTIEN, OF NORFOLK, VIRGINIA.

AUTOMOBILE ATTACHMENT.

1,079,951.  Specification of Letters Patent.  Patented Dec. 2, 1913.

Application filed June 8, 1912. Serial No. 702,621.

*To all whom it may concern:*

Be it known that I, ROBERT H. PRESTIEN, a citizen of the United States, residing at Norfolk, in the county of Norfolk and State of Virginia, have invented a new and useful Automobile Attachment, of which the following is a specification.

This invention relates to a fender attachment for automobiles, its object being to provide a simple structure of this type which can be applied readily to automobiles of the ordinary types and which normally acts as a guard or bumper to prevent injury to the machine when brought accidentally into contact with an obstruction.

Another object is to provide means under the constant control of the driver whereby the active member of the attachment can be quickly shifted into position to prevent the wheels from passing over a body in the path thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings: Figure 1 is a perspective view of the front portion of an automobile having the present improvements combined therewith. Fig. 2 is a side elevation of the attachment, the front portion of the automobile being shown partly in section and partly in elevation. Fig. 3 is a plan view of a portion of the operating mechanism of the attachment. Fig. 4 is a detail view showing the stops which cooperate to limit the movement of the fender body, the said stops being shown in the relative positions assumed thereby when the fender body or frame is in the position illustrated in Fig. 1. Fig. 5 is a detail view of the foot plate.

Referring to the figures by characters of reference A designates the front portion of an automobile and to the front springs B are applied substantially U-shaped brackets 1 held in position preferably by means of set screws 2. These brackets have downwardly and forwardly extending L-shaped arms 3 terminating in eyes 4 in which a transversely extending rod 5 is journaled. Stop lugs 6 extend downwardly from the eyes 4 and projections 7 extend from the rod 5 close to the inner sides of the eyes 4. These projections are L-shaped, as shown particularly in Figs. 1 and 4 so as to extend across the fronts of the eyes 4 and they serve to prevent the rod from sliding longitudinally and also coöperate with the lugs 6 to limit the rotation of the rod within the eyes.

Secured to the rod and revoluble therewith is a fender frame 8 so proportioned as normally to rest, along its rear edge, upon the forwardly extending portions of the arms 3. At this time the projections 7 are out of contact with the lugs 6. The frame carries a netting 9 in the form of a heavy metal fabric.

Pivotally connected to the front or bottom portion of the frame 8 are the front ends of forwardly diverging rods 10 which are formed integral with a rearwardly extending rod 11. The rod 11 is located under the chassis C of the automobile and is connected to a crank 12 carried by a transverse shaft 13. Another crank 14 is carried by this shaft and is engaged by the lower forked end 15 of a lever 16. This lever is fulcrumed, as at 17, upon the body of the automobile and pivotally connected to the upper end of the lever is a foot plate 18 having an integral projection 19 constituting a dog adapted to engage the teeth of a segment 20. A spring 21 connects the forked end of the lever 16 to the chassis C and serves to exert a constant forward pull upon the lower end of the lever.

Under normal conditions the frame 8 is supported in a substantially horizontal position as shown in Fig. 1 and at which time the foot plate 18 is in its rearmost position. With the frame thus located it will be seen that it will act as an efficient guard or bumper to prevent injury to the front of the automobile should the same be brought into contact with an obstruction. If it should be desired suddenly to use the device as a fender so as to prevent the wheels of the automobile from passing over a body in the path thereof, the driver presses the foot plate 18 forward so as thus to cause the dog 19 to slip over the teeth on the segment 20. Lever 16 will therefore partly rotate the shaft 13 and cause the crank 12 to pull on the rods 11 and 10. The projections 7 will thus be brought against the lugs 6 as soon as the frame 8 assumes a substantially vertical position. The spring 21 is of course placed under stress during this operation. As soon as it is desired to return the frame 8 to its normal position, the foot plate 18 is swung relative to lever 16 so as to disengage the dog from the toothed segment, whereupon the spring 21 will return the parts automatically to their normal positions as shown in Fig. 1.

It is of course to be understood that the particular means for attaching the arms 3 to the vehicle can be varied to meet varied conditions.

In view of the fact that the fender frame is normally supported in a horizontal position, it will be apparent that it constitutes a more efficient bumper than would be possible should it be normally extended downwardly in an inclined plane. Furthermore as all parts of the frame are supported in the same plane, the said frame is less likely to buckle when subjected to resistance. Importance is also attached to the fact that the frame is mounted to swing about an axis extending centrally therethrough. Thus it is possible to quickly shift the fender frame to a vertical position with a comparatively slight movement of the foot of the operator and it is furthermore possible to support the fender with its axis of rotation nearer the ground than would otherwise be possible, thus rendering the device more efficient as a means for preventing obstructions from passing under the vehicle to which the fender is attached.

What is claimed is:—

1. An attachment for automobiles including a fender frame mounted for rotation about a central transverse axis, means for connecting the frame to a vehicle, means for holding the frame normally substantially horizontal and projected forward for use as a bumper, and means for shifting the front edge of the frame downwardly and rearwardly to bring the frame into a substantially vertical position for use as a fender.

2. An attachment for automobiles and the like, including a fender frame mounted for rotation about a central transverse axis, means for connecting said frame to the front of an automobile, said means constituting a support for the rear portion of the fender frame when said frame is in its normal position, yielding means for holding the frame normally in a substantially horizontal position and projected forward for use as a bumper, and means for shifting the front edge of the frame downwardly and rearwardly to bring the frame into a substantially vertical position for use as a fender.

3. An attachment for automobiles including a fender frame mounted for rotation about a central transverse axis, means for connecting the frame to the front of an automobile, means under the control of the driver of the automobile to which the structure is attached for swinging the front of the frame downwardly and rearwardly to bring the frame to a substantially vertical position for use as a fender, and a spring for automatically returning said means and the fender frame to their normal positions, said fender frame being normally disposed horizontally with its rear edge bearing downwardly on the connecting means.

4. An attachment for automobiles including a fender frame mounted for rotation about a transverse axis, means for connecting the frame to the front of an automobile, yieldable means for holding said frame normally in a substantially horizontal plane for use as a bumper, said connecting means serving to limit the movement of the frame under the action of the yielding means, lever operated means for shifting the front of the frame downwardly and rearwardly out of normal position and into a substantially vertical position for use as a fender, and means for locking the frame in lowered position.

In testimony that I claim the foregoing as my own, I have hereto affixed my signature in the presence of two witnesses.

ROBERT H. PRESTIEN.

Witnesses:
L. P. MATTHEWS,
WM. H. FRANCIS.